United States Patent
Choate

Patent Number: 6,102,989
Date of Patent: Aug. 15, 2000

[54] HIGH CONDUCTANCE TRAP

[75] Inventor: Charles A. Choate, Underhill, Vt.

[73] Assignee: International Business Machines Corporation, Armonk, N.Y.

[21] Appl. No.: 08/889,949

[22] Filed: Jul. 10, 1997

[51] Int. Cl.[7] .................................................. B01D 46/00
[52] U.S. Cl. ........................................... 95/273; 55/315.1
[58] Field of Search .............................. 118/715; 95/273, 95/115, 290; 55/308, 315.1

[56] References Cited

U.S. PATENT DOCUMENTS

| | | | |
|---|---|---|---|
| 4,668,261 | 5/1987 | Chatzipeteros et al. | 62/37 |
| 4,892,653 | 1/1990 | Latge | 210/184 |
| 4,928,497 | 5/1990 | Latge | 62/55.5 |
| 5,261,963 | 11/1993 | Basta et al. | 118/724 |
| 5,427,610 | 6/1995 | Croker | 95/114 |

*Primary Examiner*—Richard Bueker
*Assistant Examiner*—Erin Fieler
*Attorney, Agent, or Firm*—Schmeiser, Olsen & Watts; Mark F. Chadurjian

[57] ABSTRACT

A high conductance trap for removing particulates from the effluent of a semiconductor processing system. The trap includes a housing having a gas inlet, a filtering arrangement, and a gas outlet. The gas inlet and gas outlet are arranged in an inline configuration to increase conductance through the trap, thereby enhancing the filtering efficiency of the filtering arrangement. Cooling coils are disposed immediately adjacent the gas inlet to immediately cool the effluent as it enters the trap, thereby further increasing the filtering efficiency of the filter arrangement.

10 Claims, 3 Drawing Sheets

HIGH CONDUCTANCE TRAP

FIELD OF THE INVENTION

This invention is in the field of semiconductor processing, and is specifically directed to an apparatus for removing particulates from the gases used or produced during semiconductor processing.

BACKGROUND OF THE INVENTION

Deposited films are widely used in the fabrication of modern semiconductor devices. These films provide, for example, conducting regions within a device, electrical insulation between metals, and protection from the environment. The deposited films must meet many strict requirements. The thickness of a deposited film must be uniform over each device and over the large number of semiconductor wafers processed at one time in a reactor. The structure and composition of the film must be carefully controlled and must be reproducible. Finally, the film deposition method must be safe, both to the environment and to the production equipment, reproducible, easily automated, and inexpensive.

Many methods are available for the deposition of films on semiconductor devices. Several common film deposition methods are atmospheric-pressure chemical vapor deposition (CVD), low-pressure chemical vapor deposition (LPCVD), and plasma-enhanced chemical vapor deposition (PCVD). Generally, these film deposition methods use temperatures in the range of 100 to 1000° C. and pressures from atmospheric down to 50 mTorr.

Unfortunately, many of the gases used to deposit films on semiconductor devices, and the gas byproducts produced during deposition, are hazardous (e.g., corrosive, flammable, poisonous, or explosive). This is especially true for low-pressure depositions because the processes typically use concentrated gases.

Often, deposition processes which use pumps to expel effluent from the deposition reactor have safety and maintenance problems associated with them, because the gases in the effluent can dissolve or react in the pumping system, or may react with air, to form particulates within the effluent. The reaction particulates commonly collect in the pumps, thereby drastically reducing the life of the pumping system and associated exhaust system.

Various trap systems have been used to remove reaction particulates from the effluent of a deposition system. One type of prior art trap system uses cooling coils in combination with a filtering arrangement to remove the reaction particulates from the effluent. The cooling coils reduce the temperature of the effluent prior to filtering to enhance the trapping of the reaction particulates by the filtering arrangement.

The effluent enters the trap system through a gas inlet and exits the trap system through a gas outlet. The gas inlet is positioned at a right angle relative to the gas outlet to allow gas expansion within the housing of the trap system. In operation, the effluent passes into a side of the trap system through the gas inlet, flows downward to the bottom of the trap housing to the cooling coils, passes upward through the filtering arrangement, and passes out of the top of the trap system through the gas outlet.

Although the above-described prior art trap system provides for the removal of reaction particulates from the effluent of a deposition system, it suffers from limited gas flow conductance and reduced filtering efficiency. This occurs because one-half of the original pressure of the effluent is lost as the effluent flows through the right angle turn formed by the relative orientation of the gas inlet and the gas outlet on the housing of the trap system.

As a result, this trap system is not suitable for use with low pressure applications such as a low pressure chemical vapor deposition system. The additional pressure reduction of the already low pressure effluent as it passes through the trap system from the gas inlet toward the gas outlet greatly reduces the effectiveness of the filtering arrangement.

SUMMARY OF THE INVENTION

In order to overcome the deficiencies of the prior art, the present invention provides a high conductance trap wherein the gas inlet is in a straight line with the gas outlet, thereby increasing gas flow through the trap by 50% and eliminating the pressure reduction and associated decrease in filtering efficiency suffered by prior art trap systems. Further, in the present invention, the cooling coils are disposed immediately adjacent the gas inlet such that the effluent is immediately cooled as it enters the trap. This is in contrast to the right angle trap system described above, where the effluent encounters the cooling coils after passing a substantial distance through the trap housing from the gas inlet. Advantageously, by cooling the effluent in this manner, the filtering efficiency of the filter arrangement within the trap system of the present invention is enhanced even further.

The high conductance trap of the present invention has been specifically designed for use in the field of semiconductor processing. However, it should be evident that the high conductance trap may be used in a wide variety of other systems which require a trap system for removing solids from a gas.

BRIEF DESCRIPTION OF THE DRAWINGS

The objects and features of the present invention will best be understood from a detailed description of preferred embodiments thereof selected for the purposes of illustration and shown in the accompanying drawings, in which.

DETAILED DESCRIPTION OF THE PREFERRED EMBODIMENTS

Figure 1:
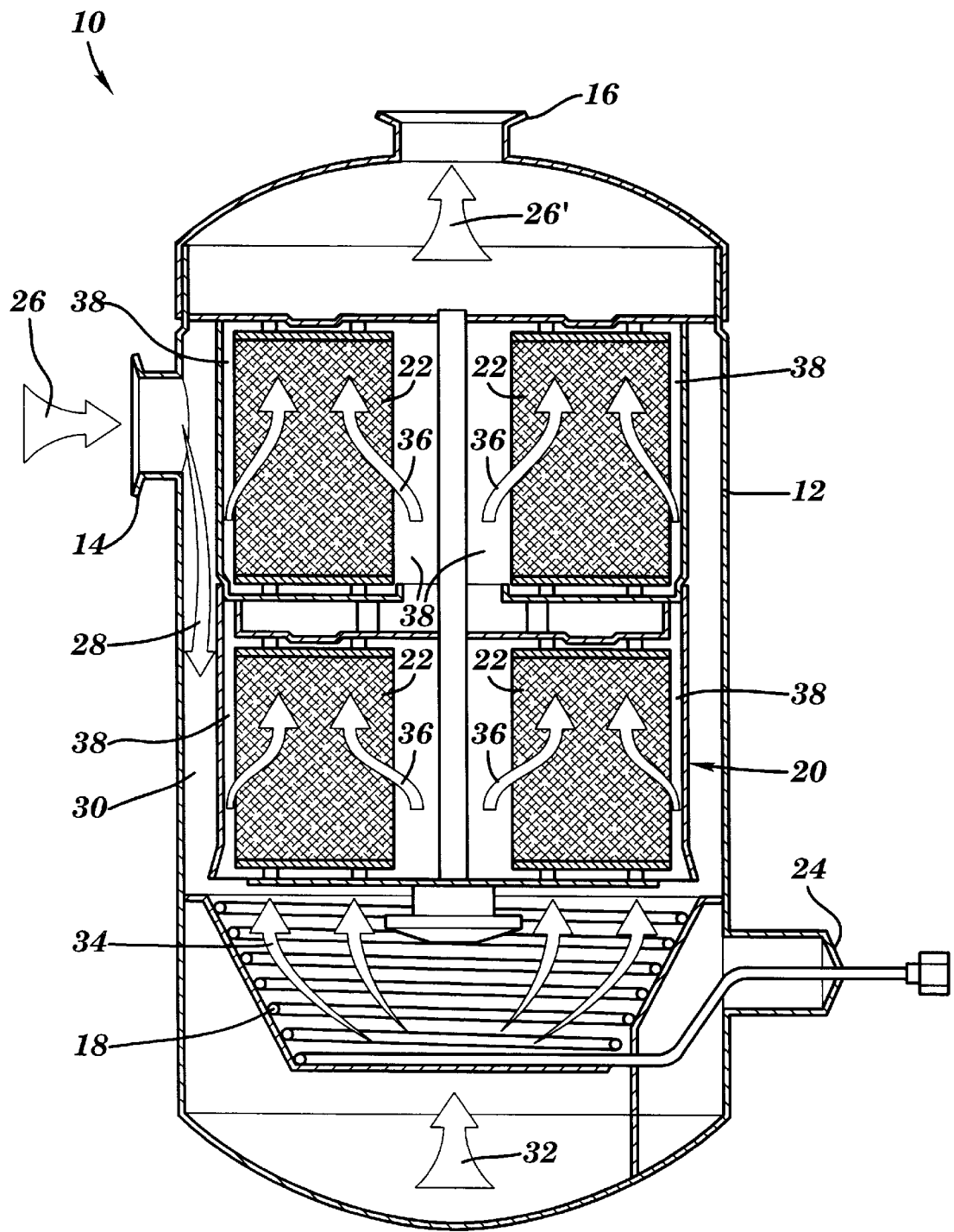
FIG. 1 is a cross-sectional view of a prior art trap system.

Referring first to FIG. 1, there is illustrated a prior art trap system 10 for removing particulates from the effluent of a semiconductor processing system. Depending on the type of processing, the effluent may contain gases used during the processing, gas byproducts produced during the processing, and/or particulates formed through the reaction of the processing gases and gas byproducts with the processing system. The trap system 10 includes a housing 12, a gas inlet 14 positioned on a side of the housing 12, and a gas outlet 16 located on the top of the housing 12. Cooling coils 18 and a filtering arrangement 20, comprising a plurality of individual filter elements 22, are enclosed within the housing 12 of the trap system 10. A refrigerant or other cooling agent is supplied to the cooling coils 18 via a port 24 formed on a side of the housing 12.

The effluent 26 from a system (not shown) is inputted into the housing 12 of the trap system 10 through the gas inlet 14.

Once inside the housing 12, the effluent 26 is directed toward the bottom of the housing (directional arrow 28) by a baffle 30. The effluent 26 is subsequently redirected upward (directional arrow 32) through the cooling coils 18 (directional arrows 34) toward the filtering arrangement 20. The cooling coils 18 are used to cool the effluent 26 prior to filtering to increase the particle capturing efficiency of the filter elements 22.

After cooling, the effluent 26 is directed into and through (directional arrows 36) the filter elements 22 by a baffle arrangement 38, and particulates in the effluent 26 are captured by the filter elements 22. The filtered effluent 26' passes out of the filter elements 22, and exits the housing 12 of the trap system 10 through the gas outlet 16.

As shown in FIG. 1, the effluent 26 enters the trap system 10 through the gas inlet 14 formed in the side of the housing 12 and exits the trap system 10 through the gas outlet 16 formed in the top of the housing 12. In this configuration, the gas inlet 14 is positioned at a right angle relative to the gas outlet 14, resulting in a 50% reduction in the pressure of the effluent 26 as it passes through the trap system 10. This adversely affects the filtering efficiency of the filter elements 22. As a consequence, the trap system 10 is not suitable for low pressure filtering applications.

Figure 2:
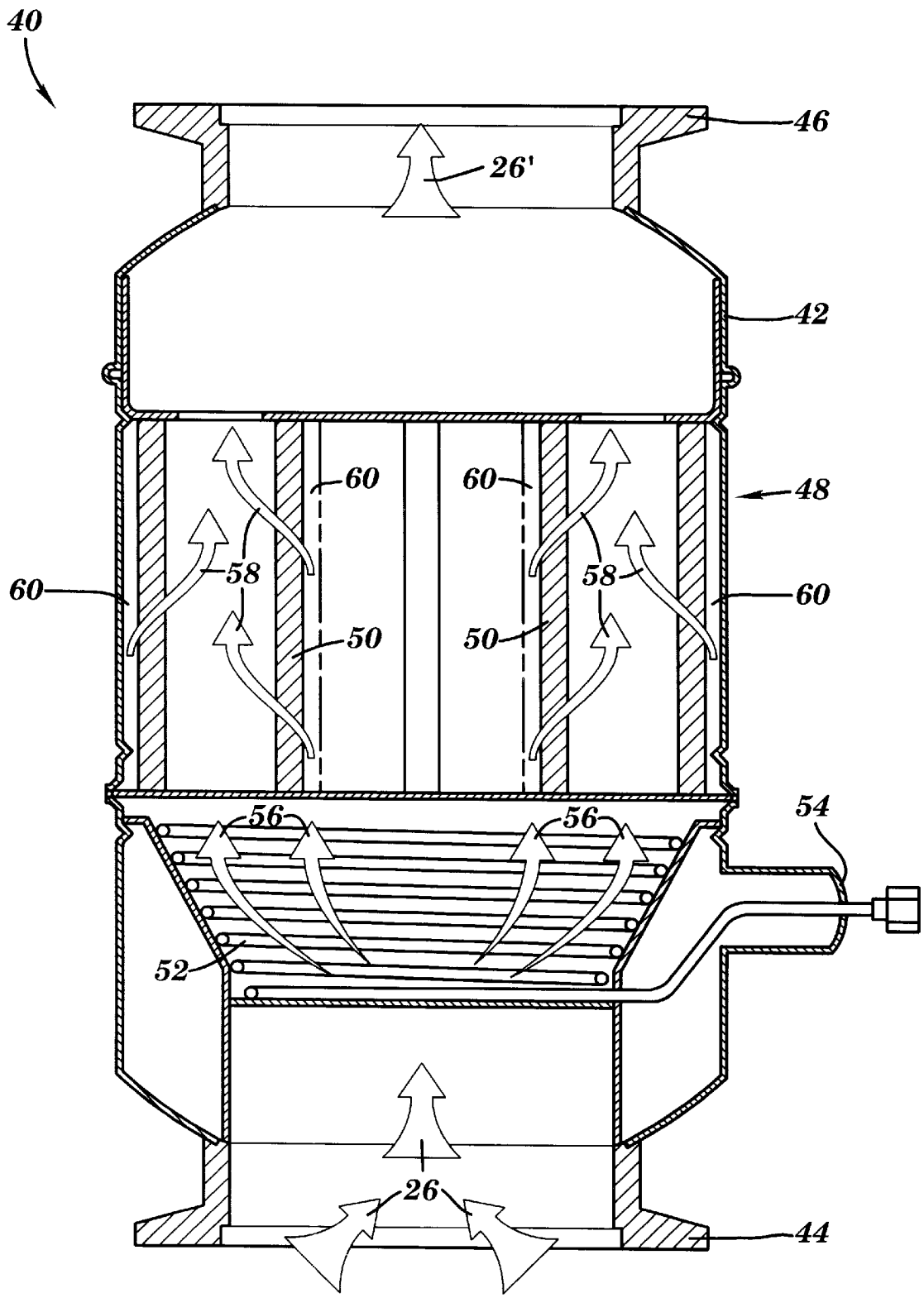
FIG. 2 is a cross-sectional view of a high conductance trap in accordance with a preferred embodiment of the present invention.

A high conductance trap, generally indicated as 40, in accordance with a preferred embodiment of the present invention, is illustrated in FIG. 2. As with the prior art trap system 10 described above with regard to FIG. 1, the trap 40 includes a housing 42, a gas inlet 44, a gas outlet 46, a filtering arrangement 48 comprising a plurality of filter elements 50, cooling coils 52, and a refrigerant supply port 54. Unlike the trap system 10, however, the gas inlet 44 is positioned on a first end of the housing 42, and the gas outlet 46 is located on a second, opposing end of the housing 42. This provides for an inline gas flow through the trap 40 from the gas inlet 44 to the gas outlet 46. By providing such an inline configuration, the gas flow (i.e., conductance) through the trap 40 is 50% greater than the gas flow through the trap system 10, thereby enhancing the filtering performance of the filter elements 50. To further increase gas flow through the trap 40, the size of the gas inlet 44 and the gas outlet 46 have been increased relative to the prior art. For example, the prior art trap system 10 typically uses a 4 inch diameter gas inlet 14 and gas outlet 16. In the present invention, however, the diameter of the gas inlet 44 and the gas outlet 46 have been increased to 6 inches.

Also, unlike the prior art trap system 10, the cooling coils 52 in the high conductance trap 40 of the present invention are now disposed immediately adjacent the gas inlet 44. As the effluent 26 enters the gas inlet 44, it is immediately cooled, or "shocked" by the cooling coils 52. This greatly enhances the removal of particulates from the effluent 26 by the filter elements 50 of the filtering arrangement 48. In fact, when compared to the prior art trap system 10, the trap 40 of the present invention provides substantially greater particle removal by locating the cooling coils 52 immediately adjacent the gas inlet 44.

In operation, the effluent 26 enters the trap 40 through the gas inlet 44 and immediately passes through the cooling coils 52 (directional arrows 56). After cooling, the effluent 26 is directed into and through the filter elements 50 (directional arrows 58) by a baffle arrangement 60 to filter particulates out of the effluent 26. The filtered effluent 26' subsequently passes out of the trap 40 through the gas outlet 46.

Figure 3:
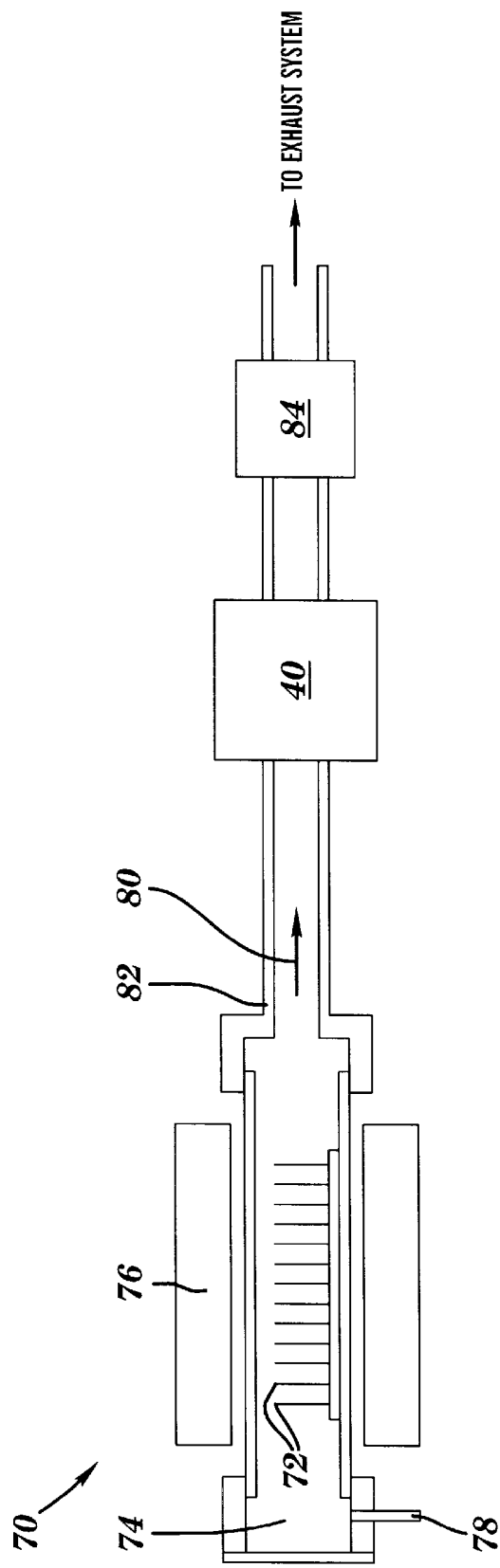
FIG. 3 illustrates a semiconductor processing system incorporating the high conductance trap of the present invention.

A semiconductor processing system 70 incorporating the trap 40 of the present invention is illustrated in FIG. 3. In this example, the semiconductor processing system 70 is a low pressure chemical vapor deposition system (LPCVD). In this system, a plurality of semiconductor wafers 72 are placed in a reactor 74 which is heated by a furnace 76. The reactant gas for the deposition process is directed into the reactor 74 through a gas inlet 78. The reaction effluent 80 is pumped out of the reactor 74 through a gas outlet 82 by a pumping system 84. To remove particulates from the effluent 80, the high conductance trap 40 is positioned between the processing system 70 and the pumping system 84.

The high conductance trap 40 of present invention has been described for use in chemical vapor deposition semiconductor processing systems. However, the trap 40 may be used in a wide variety of other semiconductor processing systems to remove particulates from the system effluent. Further, the trap 40 may also be used in systems outside the semiconductor industry to filter the system effluent.

The foregoing description of the present invention has been presented for purposes of illustration and description. It is not intended to be exhaustive or to limit the invention to the precise form disclosed, and obviously many modifications, variations, and equivalents are possible in light of the above teaching. Such modifications, variations, and equivalents that may be apparent to a person skilled in the art are intended to be included within the scope of this invention as defined by the accompanying claims.

I claim:

1. An apparatus for removing particulates from an effluent, comprising:

a housing having a gas inlet and a gas outlet;

a filtering arrangement disposed within said housing for removing particulates from the effluent; and a system for changing the temperature of the effluent prior to passing said effluent through said filtering arrangement to enhance the removal of said particulates by said filtering arrangement, the effluent passing substantially unimpeded from the gas inlet to the temperature chancing system, wherein said temperature changing system is positioned immediately adjacent the gas inlet of said housing.

2. The apparatus according to claim 1, wherein said gas inlet is in a straight line with said gas outlet on said housing.

3. The apparatus according to claim 1, wherein said gas inlet, temperature changing system, filtering arrangement and gas outlet are arranged along a straight line.

4. The apparatus according to claim 1, wherein said temperature changing system includes a cooling arrangement for cooling the effluent prior to filtering.

5. A method for removing particulates from an effluent, comprising the steps of:

directing the effluent into a trap system, the effluent passing substantially unimpeded from a gas inlet of the trap system to a temperature changing system;

filtering the effluent to remove particulates; and immediately changing the temperature of the effluent using the temperature changing system, prior to said filtering step, as the effluent enters said trap system, to enhance the removal of said particulates during said filtering step.

6. The method according to claim 5, further including the steps of:

providing said trap system with a gas inlet and a gas outlet; and arranging said gas inlet in a straight line with said gas outlet on said housing, wherein the effluent passes into the trap system through said gas inlet and passes out of said trap system through said gas outlet.

7. The method according to claim 5, wherein said temperature changing step includes the step of:

cooling the effluent prior to said filtering step.

8. A system comprising:

a semiconductor processing system; and a trap for removing particulates from an effluent produced by said semiconductor processing system, said trap including a housing having a gas inlet, a gas outlet, a filtering arrangement disposed within said housing for removing particulates from the effluent, and a system for changing the temperature of the effluent prior to passing said effluent through said filtering arrangement to enhance the removal of said particulates by said filtering arrangement, the effluent passing substantially unimpeded from the gas inlet to the temperature changing system, wherein said temperature changing system is positioned immediately adjacent the gas inlet of said housing.

9. The system according to claim 8, wherein said gas inlet is in a straight line with said gas outlet on said housing.

10. The system according to claim 8, wherein said temperature changing system includes a cooling arrangement for cooling the effluent prior to filtering.

* * * * *